Dec. 18, 1951   S. ROESNER   2,579,093
TRAP FOR RODENTS
Filed Sept. 13, 1947
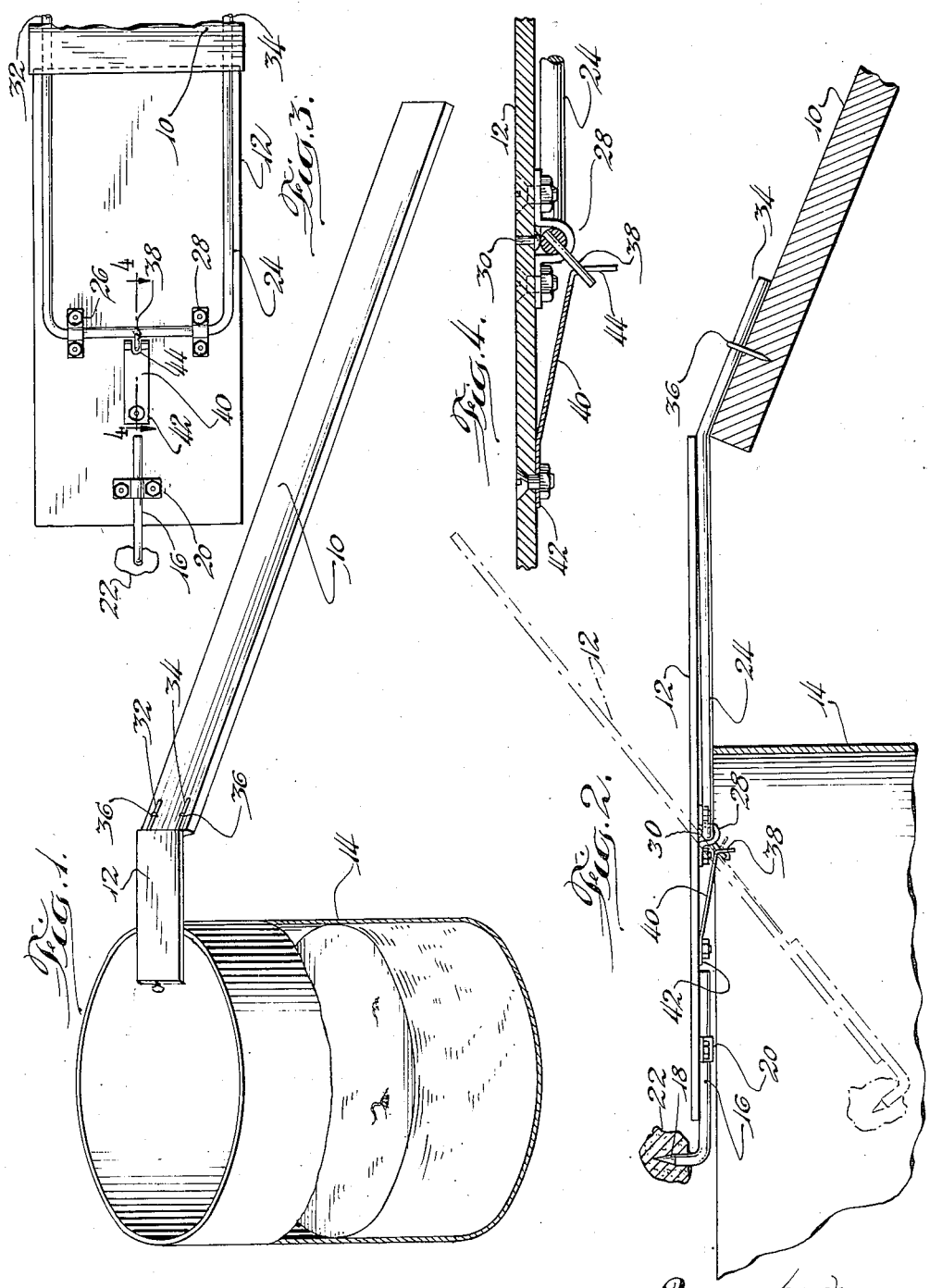

Patented Dec. 18, 1951

2,579,093

UNITED STATES PATENT OFFICE 2,579,093

TRAP FOR RODENTS

Siegmund Roesner, Roselle, Ill.

Application September 13, 1947, Serial No. 773,792

6 Claims. (Cl. 43—69)

This invention relates to traps for rodents and the like.

An important object of the present invention is to provide an effective trap that is simple and cheap to construct, and which, after capturing a rodent, is automatically readied to capture additional rodents without being manually reset or re-baited.

Another object of this invention is to provide a trap which will capture, without any special adjustment, rodents of a wide variety of sizes and weights.

Still another object of this invention is to provide a trap from which the captured and destroyed rodent may be removed and disposed of without distasteful or unpleasant handling of the rodent's body.

Yet another object of the invention is to provide a trap which may be made and used anywhere, but which is especially useful on farms or around warehouses where rats and mice are both present in large numbers, and where it is exceedingly desirable that the trap capture a large number of such rodents daily.

Other objects and advantages will be apparent from the following description, reference being had to the accompanying drawings, in which:

Fig. 1 is a side elevation of the trap completely set up for use with an attached runway and capture tank;

Fig. 2 is a plan view, taken from the side of the operating portion of the device, showing in dotted lines the position of the trap when tripped;

Fig. 3 is a plan view of the operating portion of the device, taken from underneath the tripping platform; and Fig. 4 is a side view of the tripping portion of the device, partially in section, taken along the lines 4—4 of Fig. 3.

The complete trap of the invention includes three major portions, a runway 10, providing an avenue of approach to the trap, a tilting platform 12 to drop the rodent into a vat, and a tank or vat 14, to hold and kill the captured rodent. The especial novelty of the device resides in the construction of the tilting platform 12 and its associated parts, and in its combination with the runway 10 and vat 14.

The runway 10 may be of any suitable material or size, since it merely provides access to the tilting platform 12. However, a plain pine board, six inches wide, an inch thick, and five feet in length, is very satisfactory.

Likewise, the tank or vat 14 may take a wide variety of shapes and sizes. Preferably, however, it should have fairly smooth rounded sides so that it does not provide a foothold for a rodent and it should be of a depth such that the rodent cannot jump out of it. Also, it should be of a depth so that liquid deep enough to drown the rodent may be placed therein. A half of a standard 55 gallon steel drum, such as commonly used for containing gasoline, is very satisfactory.

The function of the tilting platform 12 is to hold out the bait to entice the rodent up the runway 10 and then to drop the rodent into the vat 14 before the bait is reached, resetting itself when that has occurred.

The tilting platform 12 may be made of wallboard or other suitable material. A rectangular piece of wallboard about 12" long, 5" wide, and 1/8" thick has proved very satisfactory.

At the outer end of the platform 12 is mounted an adjustable bait hook. This is illustrated as a piece of iron rod 16 approximately 3" long, having a sharpened point 18 turned up from the rod at right angles thereto. The rod is mounted on the underside of the platform 12 by a bracket 20 fastened to the platform by screws, rivets, or the like. The bracket is mounted tightly over the rod about midway of its length, so that the rod is held in frictional engagement with the underside of the platform. So mounted, the rod may be moved manually forward or backward relative to the platform. In use, a piece of bacon or other bait 22 is placed on the point 18 and the rod 16 may be moved forward or backward in the bracket 20 until the tilting platform 12 has reached a point of balance in horizontal position.

On the underside of the platform 12, at a point slightly forward of its center, is mounted a U-shaped rod 24. This is connected to the platform 12 by brackets 26 and 28 suitably secured by screws or rivets. In order to provide smooth bearing surfaces and only light frictional resistance between the rod 24 and the platform 12, two round headed brads 30 are driven into the platform 12 from the underside thereof, midway between the screws or rivets of the brackets 26 and 28. These brads 30 may be cut off, if necessary, so that they will not project beyond the top surface of the platform 12.

The rod 24 should be long enough to project a substantial distance beyond the runway end of the platform 12, providing the free ends 32 and 34. These may then be bent downwardly at a suitable angle, depending upon the length of the runway 10, to which they are fastened in any suitable manner, such as by staples 36.

Midway between the sides of the U-shaped rod 24, on the portion thereof forming the bottom of the U, is inserted a steel peg 38. This peg projects downwardly and forwardly from the rod 24 at an angle of approximately 120° relative to the plane of the rod 24. Its purpose is to stop the tilt of the platform 12 and to assist in the resetting of the platform.

To effect a resetting of the platform 12 and to return it to horizontal position, there is provided a spring 40. This is made of flat spring steel and is mounted on the underside of the platform 12 centrally thereof between the rod 24 and the bait hook 16. Its forward end 42 is fastened to the platform 12 by a screw or a rivet. At the free end of the spring 40 is formed a slot 44 about ⅜" deep. The ends of the spring 40, on either side of the slot 44, are bent outwardly relative to the platform 12 at about an 80° angle. The spring 40 is then bent slightly away from the platform 12 so that it is in contact therewith only at its forward end 42.

The operation of the trap is as follows.

The vat 14 is filled with crank case oil to a depth of six or eight inches. The tilting platform 12 is fastened to one end of the runway 10 and the platform 12 is then rested on the top edge of the vat 14 as shown in Fig. 1, the edge of the vat being located about midway between the brackets 26 and 28, and the upper end of the runway 10. A piece of bait is fastened to the pointed end 18 of the bait hook 16 and the shank thereof is moved forward or backward in the bracket 20 until the platform 12 is so balanced as to remain in horizontal position. If desired, grain or other bait may be sprinkled on the runway and platform, although that is not essential.

A rodent attracted by the bait, will climb the runway and move onto the platform 10. As it nears the bait 22, the weight of the rodent, whether the animal be large or small, when it advances beyond the point of the bearings 30, will cause the forward end of the platform 12 to drop suddenly downward, tilting about the forward end of the rod 24. The rat, mouse, or other rodent is thrown off the platform 12, the steep incline and smooth surface thereof being such that the rodent cannot back up or pull itself back on the platform. The rodent is thrown into the waste oil or liquid in the vat 14, and since it cannot jump out, it will drown therein in a short time.

The bait being well forward of the point of balance of the platform 12, the rodent does not reach it or remove it before the rodent is thrown into the vat; hence it is not necessary to re-bait the trap for further use.

When the front end of the platform 12 is caused to tilt downwardly, the peg 38 engages the spring 40, pressing it toward the platform 12. When the spring 40 touches the underside of platform 12, the peg 38 acts as a stop, preventing further rotation or tilting of the platform 12. At this point, the weight of the rodent having been removed from the platform, the spring 40 urges the forward end of platform 12 upward until it is in such position that its own weight and momentum carry it to horizontal position, automatically reset for further operation.

The slot 44 in the spring 40 permits the platform 12 to tilt downwardly a short distance before the pin 38 contacts the spring 40. Thus there is no initial resistance of the spring to the tilting movement. The slot 44 and the pin 38 together perform an additional function in that they serve to center the U-shaped rod 24, preventing any substantial lateral movement thereof.

The rats, mice, and other animals thrown into the vat will die quickly by drowning in the waste oil or other liquid used, and present no serious problem of removal and disposition. Their bodies are not mangled, and no scent is left upon the trap. They can be removed from the vat by a rake or dipper and burned or buried. A basket or other collecting means within the vat may also be used. In any event, the problem of removing a mangled or still living animal from the trap is completely avoided.

While I have shown and described a preferred embodiment of my invention, it will be apparent that numerous variations and modifications thereof may be made without departing from the underlying principles of the invention. I therefore desire, by the following claims, to include within the scope of the invention all such variations and modifications by which substantially the results of my invention may be obtained through the use of substantially the same or equivalent means.

I claim:

1. In a trap for rodents and the like, including an approach runway and a vat, a tripping mechanism comprising a platform rotatably mounted on an axle, means connected to said axle and adapted to rest upon said vat and to be connected to said approach runway, adjustable weight balancing means mounted at one end of said platform, and trap resetting means including a spring and a stop pin cooperatively associated therewith and affixed on said axle to oppose said spring during a downward movement of said platform and limiting the rotation of said platform, said spring normally urging said platform into a substantially horizontal position.

2. In a trap for rodents and the like, including an approach runway and a vat, a tripping mechanism comprising a platform, an adjustable bait hook mounted at one end thereof, a U-shaped rod mounted on the underside of the platform within fixed bearings mounted thereon, affording an axis of rotation for said platform, the free ends of said rod being adapted for attachment to said approach runway and to rest upon the edge of said vat, and trap resetting means including a spring mounted on the underside of said platform and a stop pin attached to said U-shaped rod to compress said spring during the downward tilting of said platform.

3. A trap for rodents and the like, comprising a rodent receiving and retaining vat adapted to be partially filled with liquid, an approach runway, a tilting platform, support means adapted to rest on the edge of said vat and to be connected to said approach runway, said means including an axle, said tilting platform being mounted on said axle, the front end of said platform being so balanced as to turn downwardly when the weight of a rodent moves forwardly on said platform beyond said axle, and trap resetting means including a spring and an abutting stop pin to return the platform substantially to horizontal position after the rodent's weight has been removed therefrom.

4. The combination set forth in claim 3, in which said spring is of the strap type and has one end fastened to the underside of said platform, the remainder of said spring being normally tensioned away from contact with said platform, the free end of said spring having a slotted opening therein and being inclined substantially at right angles away from said platform, and said stop pin is adapted during tilting movement of said platform to compress the spring toward said platform, the compression of said spring acting against said stop pin normally urging the platform to return to substantially horizontal position.

5. The combination set forth in claim 3, in which said support means comprises a unitary U-shaped rod.

6. In a trap for rodents and the like, including an approach runway and a vat, a tripping mechanism comprising a tiltable platform, a bait hook mounted at the outer end of said platform, a generally U-shaped rod mounted on the underside of said platform within fixed bearings mounted thereon thereby providing an axis of rotation for said platform, the free ends of said rod being adapted for attachment to the approach runway and to rest upon the edge of the vat, and trap resetting means including a spring mounted on the underside of said platform and means on said U-shaped rod to compress said spring during downward tilting movement of the outer end of said platform and to limit the downward tilting movement.

SIEGMUND ROESNER.

REFERENCES CITED

The following references are of record in the file of this patent:

UNITED STATES PATENTS

| Number | Name | Date |
|---|---|---|
| 70,134 | Trevitt | Oct. 22, 1867 |
| 1,517,192 | Cervenec | Nov. 25, 1924 |
| 1,520,557 | Berg | Dec. 23, 1924 |
| 1,552,855 | Jenkins | Sept. 8, 1925 |